(12) United States Patent
Seo et al.

(10) Patent No.: US 7,132,474 B2
(45) Date of Patent: Nov. 7, 2006

(54) METHOD FOR PREPARING STYRENIC RESIN HAVING HIGH IMPACT STRENGTH AND GLOSS

(75) Inventors: Jae-burn Seo, Yeosu-si (KR); Sang-seop Kim, Incheon (KR); Chang-hun Han, Daejeon (KR)

(73) Assignee: LG Chem. Ltd. (KR)

( * ) Notice: Subject to any disclaimer, the term of this patent is extended or adjusted under 35 U.S.C. 154(b) by 0 days.

(21) Appl. No.: 11/222,164

(22) Filed: Sep. 8, 2005

(65) Prior Publication Data

US 2006/0058466 A1    Mar. 16, 2006

(30) Foreign Application Priority Data

Sep. 8, 2004    (KR) ...................... 10-2004-0071580

(51) Int. Cl.
*C08F 297/04*    (2006.01)
(52) U.S. Cl. .................. 525/53; 525/243; 525/261; 525/263; 525/316; 525/942
(58) Field of Classification Search ................ 525/53, 525/263, 316, 942, 243, 261
See application file for complete search history.

(56) References Cited

U.S. PATENT DOCUMENTS

| | | | |
|---|---|---|---|
| 2,694,692 A | 11/1954 | Amos et al. ................ 260/45.5 |
| 3,337,650 A | 8/1967 | Marcil et al. ................ 260/880 |
| 3,511,895 A | 5/1970 | Kydonieus et al. ......... 260/876 |
| 3,658,946 A | 4/1972 | Bronstert et al. | |
| 4,146,589 A | 3/1979 | Duprt ..................... 260/876 R |
| 4,254,236 A | 3/1981 | Burk .......................... 525/316 |
| 4,417,030 A | 11/1983 | Aliberti et al. ............. 525/316 |
| 4,587,294 A | 5/1986 | Matsubara et al. ........... 525/53 |
| 4,639,494 A | 1/1987 | Imai et al. .................. 525/271 |
| 4,640,959 A | 2/1987 | Alle .......................... 525/316 |
| 5,191,023 A | 3/1993 | Iwamoto et al. ............ 525/314 |
| 5,414,045 A | 5/1995 | Sue et al. ...................... 525/86 |
| 5,506,304 A * | 4/1996 | Otsuzuki et al. .............. 525/53 |
| 5,569,709 A | 10/1996 | Sue et al. ...................... 525/52 |
| 2001/0031827 A1* | 10/2001 | Virkler et al. ................. 525/53 |

FOREIGN PATENT DOCUMENTS

| | | |
|---|---|---|
| EP | 0 103 657 | 3/1984 |
| EP | 0 160 974 | 11/1985 |
| EP | 0 277 687 | 8/1988 |
| EP | 0 400 479 | 12/1990 |
| JP | 59-232140 | 12/1984 |
| JP | 5-194676 | 8/1993 |
| JP | 5-247149 | 9/1993 |
| JP | 6-13590 | 2/1994 |
| JP | 6-65330 | 3/1994 |
| JP | 6-166729 | 6/1994 |

* cited by examiner

*Primary Examiner*—Fred Teskin
(74) *Attorney, Agent, or Firm*—Cantor Colburn LLP

(57) ABSTRACT

The present invention relates to a preparation method for acrylonitrile-butadiene-styrene resin by continuous bulk polymerization comprising the following steps of a) preparing a mixed solution of styrene monomers and acrylonitrile monomers by adding 5–10 weight % of the mixture of styrene monomers and acrylonitrile monomers to a reaction solvent; b) preparing a polymerization solution by dissolving butadiene rubber in the above mixed solution of styrene monomers and acrylonitrile monomers; c) polymerizing with a serial injection of the prepared polymerization solution and initiator in a grafting reactor; d) polymerizing the reaction solution of the above c) in a phase inversion reactor by adding 90–95 weight % of the total mixture of styrene monomers and acrylonitrile monomers thereto; and e) polymerizing further the reaction solution of the above step d) at 130–160° C. The resin prepared by the method of the present invention thus has excellent impact strength and gloss.

8 Claims, No Drawings

METHOD FOR PREPARING STYRENIC RESIN HAVING HIGH IMPACT STRENGTH AND GLOSS

CROSS-REFERENCE TO RELATED APPLICATIONS

This application claims the benefit of Korean Patent Application No. 10-2004-0071580, filed on Sep. 8, 2004, in the Korean Intellectual Property Office, the disclosure of which is incorporated herein by reference.

BACKGROUND

1. Field of the Invention

The present invention relates to a preparation method for acrylonitrile-butadiene-styrene (ABS) resin, more precisely, a preparation method for rubber-modified styrene copolymer resin having high impact strength and gloss, in which rubber is mixed with a monomer at the ratio of 5–10 weight % to 100 weight % of monomer in a graft reactor at the early reaction stage to regulate the graft reaction between rubber and monomer.

2. Discussion of Related Art

Preparation methods of ABS resin, a rubber-modified styrene copolymer resin, are exemplified by emulsion polymerization, suspension polymerization, solution polymerization, bulk polymerization, a joint use of suspension polymerization and bulk polymerization, and a joint use of emulsion polymerization and bulk polymerization. Among these methods, emulsion polymerization and bulk polymerization are most widely used, and in particular emulsion polymerization is most preferred. ABS resin prepared by the emulsion polymerization has good mechanical properties and gloss resulted from the average size of 0.2–1.5 μm of rubber particles that exist in dispersed phase in continuous phased styrene-acrylonitrile copolymer (SAN copolymer). However, those physical properties might be decreased with the use of emulsifier and coagulant, which are necessary for the emulsion polymerization process. That is, emulsifier and coagulant cannot be completely eliminated during the coagulation and dehydration processes, and remain in the final product, resulting in the decrease of physical properties of the product. In addition, contaminated water used as a polymerization medium can not be simply discarded. And, compared with bulk polymerization, a kind of a continuous process, the emulsion polymerization needs coagulation and dehydration processes separately after polymerization, so the emulsion polymerization is non-economic.

The method for production of ABS resin by continuous bulk polymerization is described in U.S. Pat. Nos. 3,337,650, 3,511,895, and No. 4,417,030. Bulk polymerzation is a kind of polymerization in which styrene monomers and acronitrile monomers are dissolved in a reaction medium according to a certain ratio, butadiene rubber or styrene-butadiene rubber is dissolved in the above mixture, and a proper amount of reaction initiator, molecular regulator and other additives are added to the reaction solution above, followed by heating. As the bulk polymerization proceeds, SAN copolymer is produced by styrene monomers and acrylonitrile monomers, and these styrene monomers and acrylonitrile monomers are reacted with dissolved butadiene rubber or styrene-butadiene rubber to produce graft SAN copolymer. The prepared SAN copolymer is not mixed with rubber dissolved in the reaction medium from the beginning of the reaction and makes two phases, making the total polymerization solution heterogeneous phase. Even under such heterogeneous phase, rubber dissolved in the polymerization solution is in continuous phase in the early reaction stage showing low conversion rate, but once the phase volume of copolymer of styrene or styrene derivatives and acrylonitrile or acrylonitrile derivatives, which is increased as reaction continuous, is bigger than that of rubber in the polymerization solution, the copolymer makes continuous phase. This phenomenon is called 'phase inversion' and the time point when the volume of the copolymer is equal to the volume of rubber is called phase inversion time. After phase inversion, rubber phase becomes dispersed phase, suggesting that rubber particles are included in the final resin product.

This ABS resin product has excellent plasticity, dimensional stability and impact resistance, so that it has been applied to the various industrial fields such as electric appliances, office machine parts, motorcar parts, etc. The mechanical properties and gloss of ABS resin are affected by the size, composition and content of rubber particles included in the resin, for example when the content of rubber particles in resin is low or the sizes of the rubber particles are small, tensile strength and gloss are improved but elongation and impact strength are reduce. On the contrary, when the content of rubber particles in resin is increased, the impact strength is enhanced but gloss is degraded. Such problems are attributed to the difference in graft reaction of butadiene rubber, styrene monomer and acrylonitrile in the early reaction stage. Styrene-acrylonitrile resin, a matrix of ABS resin, is incompatible against butadiene rubber forming dispersed phase. Monomer grafting butadiene rubber lies in between butadiene rubber and styrene-acrylonitrile matrix (SAN matrix), which increases the adhesion of rubber with matrix and disperses rubber particles minutely, making monomer grafting butadiene rubber as a successful candidate for compatibilizer. The decrease of grafting reaction in the early reaction stage results in irregular disperse of rubber particles on styrene-acrylonitrile matrix. On the contrary, the excessive grafting reaction results in poor disperse of polymer solution during polymerization, leading to the decrease of fluidity and gloss of the final resin product. More precisely, when grafted chains make longer line, these chains push out styrene-acrylonitrile chains on matrix, inducing phase separation.

Therefore, a resin having excellent impact resistance and gloss can be prepared by regulating grafting reaction in the early stage and controlling rubber particles.

U.S. Pat. Nos. 2,694,692, 3,243,481 and 3,658,946 and EP No. 400479 describe that a polymerization method in which rubber is dissolved in aromatic vinyl compound and unsaturated nitrile compound and radical initiator is added to the reaction solution. The product by the method has excellent mechanical properties but poor gloss.

According to U.S. Pat. No. 4,640,959 and EP No. 103657, ABS resin having comparatively big particles 1.5 μm in average diameter has been prepared by solid phase polymerization, in which high viscosity butadiene rubber having 120 cp of solution viscosity was added to 5% styrene solution and conditions like monomer composition, reaction initiator, injection time and amount of molecular weight regulator and stirring speed were regulated. The product by the method shows excellent impact strength owing to the big particles but poor gloss.

U.S. Pat. No. 4,146,589 introduces the method of preparing a resin by polymerizing each rubber solution containing big particles and small particles in each reactor, respectively, which was then mixed. U.S. Pat. No. 4,254,236 describes another method for preparing a resin, in which rubber solution was polymerized in the first reactor and then other rubber solution having the same composition as the earlier one was polymerized in the second reactor to produce a resin whose rubber particles included bimodal.

U.S. Pat. Nos. 5,414,045 and 5,569,709 describe that ABS resin having excellent impact strength and gloss can be prepared by continuous bulk polymerization using a bulk polymerization reactor and a continuous stirred polymerization reactor, which facilitates the regulation of phase inversion and the up-regulation of graft copolymer content. However, to produce a resin with this method, special reaction equipment is required to increase the content of grafted side chain group, and the impact strength, gloss and tensile strength of the final product thereby are not so good.

U.S. Pat. Nos. 5,191,023, 4,587,294 and 4,639,494, and EP No. 277687 and Japanese Patent Publication No. 59-23214 and No. 59-179611 also introduce a method for producing a resin by using star-branched rubber. Japanese Patent Publication No. 5-194676, No. 5-247149, No. 6-166729 and No. 6-65330 and EP No. 160974 describe a method for preparing a bimodal resin, where small and big rubber particles are dispersed together, by using star-branched rubber and linear rubber. In the meantime, according to U.S. Pat. No. 5,569,709, grafting reaction was regulated by using a tubular reactor as a graft reactor, which resulted, though, in the excessive production of monomers in the early reaction stage, making the control of grafting difficult. Besides, the final product thereby showed poor balance between gloss and mechanical properties.

SUMMARY OF THE INVENTION

To solve the above problems, it is an object of the present invention to provide a preparation method for ABS resin having excellent impact strength and gloss. The above object of the present invention can be achieved by the following embodiments of the invention. To achieve the above object, the present invention provides a preparation method for a crylonitrile-butadiene-styrene resin by continuous bulk polymerization comprising the following steps:

a) preparing a mixed solution of styrene monomers and acrylonitrile monomers by adding 5–10 weight % of the mixture of styrene monomers and acrylonitrile monomers to a reaction solvent;

b) preparing a polymerization solution by dissolving butadiene rubber in the above mixed solution of styrene monomers and acrylonitrile monomers;

c) polymerizing with a serial injection of the prepared polymerization solution and initiator in a grafting reactor;

d) polymerizing the reaction solution of the above c) in a phase inversion reactor by adding 90–95 weight % of the total mixture of styrene monomers and acrylonitrile monomers thereto; and e) polymerizing further the reaction solution of the above step d) at 130–160° C.

In the above step c), a molecular weight regulator can be additionally included in the grafting reactor by 0.01–1 weight %.

The styrene monomer can be a compound selected from a group consisting of styrene, α-methylstyrene, p-bromostyrene, p-methylstyrene, p-chlorostyrene, o-bromostyrene and a mixture of them.

The acrylonitrile monomer can be one or more compounds selected from a group consisting of acrylonitrile, methacrylonitrile, and ethacrylonitrile.

The reaction solvent used above can be one or more compounds selected from a group consisting of toluene, ethylbenzene and xylene.

The butadiene rubber can be either butadiene rubber or styrene-butadiene rubber.

The initiator can be one or more organic peroxides selected from a group consisting of t-butylperoxy-2-ethyl-hexanoate, 1,1-bis(t-butylperoxy)-3,3,5-trimethyl cyclohexane, 1,1-bis(t-butylperoxy) cyclohexane, 1,1-bis(t-butylperoxy)-2-methyl cyclohexane and 2,2-bis(4,4-di-t-butylperoxy cyclohexyl) propane.

The molecular weight regulator can be one of t-dodecyl mercaptan or n-octyl mercaptan, thiol compounds.

The present invention also provides acrylonitrile-butadiene-styrene resin prepared by the preparation method of the present invention above.

DETAILED DESCRIPTION OF PREFERRED EMBODIMENTS

Hereinafter, the present invention is described in detail.

To provide ABS resin having excellent impact strength and gloss, the preparation method for acrylonitrile-butadiene-styrene resin of the present invention is characterized by regulating grafting reaction between rubber and monomers by adding only 5–10 weight % of total monomers to the grafting reactor.

A reaction solution was prepared by continuous bulk polymerization by mixing only 5–10 weight % of total styrene and acrylonitrile monomers with ethyl benzene, a reaction solvent. Polymerization solution prepared by dissolving butadiene rubber, 0.01–0.1 weight % of initiator and 0.01–1 weight % of molecular weight regulator were added to the mixed solution, which was injected serially in the grafting reactor. The first polymerization was induced in the grafting reactor to induce grafting reaction between rubber and the monomer mixture of styrene monomers and acrylonitrile monomers at 80–110° C. The second polymerization was performed with the supply of 90–95 weight % of the monomer mixture of styrene and acrylonitrile monomers in the phase inversion reactor at 110–130° C. to induce phase inversion. Then, the third polymerization was performed at 130–160° C. When polymerization conversion rate reached 65–95%, the monomers remaining not reacted and reaction medium were eliminated in a volatile tank at 200–260° C., resulting in ABS resin in the form of pellet.

In the present invention, polymerization is preferably performed by bulk polymerization and ethylbenzene is preferred as a reaction solvent. The preferable content of the reaction solvent is 10–45 weight part for 100 weight part of raw material monomers. When the content of the reaction solvent is less than 10 weight part, it is difficult to regulate viscosity. When the content of the reaction solvent is more than 45 weight part, it is also difficult to regulate the sizes and shapes of rubber particles formed during the polymerization.

Styrene monomer used as a raw material for the production of ABS resin of the invention can be selected from a group consisting of styrene, α-methylstyrene, p-bromostyrene, p-methylstyrene, p-chlorostyrene, o-bromostyrene and a mixture of them. And acrylonitrile monomer can be selected from a group consisting of acrylonitrile, methacrylonitrile and ethacrylonitrile.

It is also preferred to add styrene and acrylonitrile monomers by 5–10 weight % for the total amount of the monomer mixture of styrene and acrylonitrile monomers to the grafting reactor, in the early reaction stage, and by 90–95 weight % to the phase inversion reactor. When the amount of those monomers were less than 5 weight %, the grafting reaction with rubber was not carried out satisfactorily. On the other hand, when the amount of those monomers were more than 10 weight %, styrene-acrylonitrile matrix production predominated over grafting reaction, so that it was difficult to control grafting reaction effectively, and further the qualities of mechanical properties and gloss of the final resin product were decreased.

The reaction solvent can be one or more compounds selected from a group consisting of toluene, ethylbenzene and xylene, and the preferable content of the solvent is 10–45 weight part for 100 weight part of the total raw material monomers (styrene monomers+acronitrile monomers) to lower viscosity of polymerization solution.

In the present invention, an organic peroxide is used as an initiator to induce and to regulate grafting reaction and conversion rate, and the organic peroxide can be one of t-butylperoxy-2-ethylheanoate, 1,1-bis(t-butylperoxy)-3,3,5-trimethyl cyclohexane, 1,1-bis(t-butylperoxy)cyclohexane, 1,1-bis(t-butylperoxy)-2-methyl cyclohexane, and 2,2-bis(4,4-di-t-butylperoxy cyclohexyl) propane. The preferable content of the initiator is 0.01–0.1 weight %.

When the content of an initiator is less than 0.01 weight %, polymerization is not successfully performed in the grafting reactor, resulting in unbalance of the whole resin. In the meantime, the over-dose of the initiator results in excessive increase of viscosity, which not only is dangerous and unfavorable but also reduces the physical properties of a resin.

It is preferred in the present invention to use a thiol compound such as t-dodesyl mercaptane or n-octyl mercaptane as a molecular weight regulator by 0.01–1 weight % to regulate the size and distribution of particles and viscosity of a resin.

The molecular weight regulator is used to prevent the excessive increase of viscosity during the production process, which is thus counter-acting to an initiator. When the content of the molecular weight regulator is less than 0.01 weight %, viscosity is increased excessively, causing the drop of quality of resin properties. On the contrary, when the content of the molecular weight regulator is over 1%, polymerization is not properly induced, resulting in unbalance of the whole resin.

The present invention further provides acrylonitrile-butadiene-styrene resin prepared by the above preparation method of the invention.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

4.7 weight % of styrene monomers and 1.2 weight % of acrylonitrile monomers were dissolved in 73.7 weight % of ethylbenzene, a reaction solvent, to which 20.5 weight % of butadiene rubber was added. Then, 0.02 weight % of an initiator, t-butylperoxy-2-ethylhexanoate was added thereto, resulting in a polymerization solution. The polymerization solution was injected into a 26 L graft reactor at the speed of 5.7 L/hr, followed by polymerization at 100° C. The mixed solution of styrene monomers (80 weight %) and acrylonitrile monomers (20 weight %) was injected in the second phase inversion reactor at the speed of 6.3 L/hr, followed by polymerization at 120° C. Polymerization was also induced in the third and the forth reactors respectively at 140° C. and at 145° C. When polymerization conversion rate reached 90%, monomers remaining not reacted and the reaction solvent were eliminated in volatile tank at 230° C., resulting in the preparation of ABS resin in the form of pellet. The physical properties of the final ABS resin were investigated and the results are shown in Table 1.

EXAMPLE 2

6.8 weight % of styrene monomers and 1.7 weight % of acrylonitrile monomers were dissolved in 71.6 weight % of ethylbenzene, a reaction solvent, to which 19.9 weight % of butadiene rubber was added. Then, 0.02 weight % of an initiator, t-butylperoxy-2-ethylhexanoate was added thereto, resulting in a polymerization solution. The prepared polymerization solution was injected in a 26 L graft reactor at the speed of 5.8 L/hr, followed by polymerization at 100° C. The mixed solution of styrene monomers (80 weight %) and acrylonitrile monomers (20 weight %) was injected in the second phase conversion reactor at the speed of 6.13 L/hr, followed by polymerization at 120° C. The rest of the ABS resin production procedure was the same as described in Example 1. The physical properties of the final ABS resin were measured and the results are shown in Table 1.

EXAMPLE 3

8.4 weight % of styrene monomers and 2.2 weight % of acrylonitrile monomers were dissolved in 69.9 weight % of ethylbenzene, a reaction solvent, to which 19.5 weight % of butadiene rubber was added. Then, 0.02 weight % of an initiator, t-butylperoxy-2-ethylhexanoate was added thereto, resulting in a polymerization solution. The prepared polymerization solution was injected in a 26 L graft reactor at the speed of 6.0 L/hr, followed by polymerization at 100° C. The mixed solution of styrene monomers (80 weight %) and acrylonitrile monomers (20 weight %) was injected in the second phase conversion reactor at the speed of 6.0 L/hr, followed by polymerization at 120° C. The rest of the ABS resin production procedure was the same as described in Example 1. The physical properties of the final ABS resin were measured and the results are shown in Table 1.

COMPARATIVE EXAMPLE 1

1.9 weight % of styrene monomers and 0.5 weight % of acrylonitrile monomers were dissolved in 76.3 weight % of ethylbenzene, a reaction solvent, to which 21.3 weight % of butadiene rubber was added. Then, 0.02 weight % of an initiator, t-butylperoxy-2-ethylhexanoate was added thereto, resulting in a polymerization solution. The prepared polymerization solution was injected in a 26 L graft reactor at the speed of 5.5 L/hr, followed by polymerization at 100° C. The mixed solution of styrene monomers (80 weight %) and acrylonitrile monomers (20 weight %) was injected in the second phase conversion reactor at the speed of 6.5 L/hr, followed by polymerization at 120° C. The rest of the ABS resin production procedure was the same as described in Example 1. The physical properties of the final ABS resin were measured and the results are shown in Table 1.

COMPARATIVE EXAMPLE 2

12.5 weight % of styrene monomers and 3.1 weight % of acrylonitrile monomers were dissolved in 66.0 weight % of ethylbenzene, a reaction solvent, to which 18.4 weight % of butadiene rubber was added. Then, 0.02 weight % of an initiator, t-butylperoxy-2-ethylhexanoate was added thereto, resulting in a polymerization solution. The prepared polymerization solution was injected in a 26 L graft reactor at the speed of 6.4 L/hr, followed by polymerization at 100° C. The mixed solution of styrene monomers (80 weight %) and acrylonitrile monomers (20 weight %) was injected in the second phase conversion reactor at the speed of 5.6 L/hr, followed by polymerization at 120° C. The rest of the ABS resin production procedure was the same as described in Example 1. The physical properties of the final ABS resin were measured and the results are shown in Table 1.

COMPARATIVE EXAMPLE 3

All the monomers were injected in the graft reactor to prepare polymerization solution. That is, to 35 weight % of ethyl benzene, a reaction solvent, was added the mixed solution of styrene monomers (44.2 weight %) and acrylonitrile monomers (11.05 weight %), to which 9.75 weight % of butadiene rubber was added. After complete dissolving of butadiene rubber therein, t-butylperoxy-2-ethylhexanoate was added by 0.02 weight % as an initiator, and polymerization solution was finally prepared. The prepared polymerization solution was injected in a 26 L graft reactor at the speed of 12 L/hr, followed by polymerization at 100° C. The mixed solution was injected in the second phase conversion reactor, followed by polymerization at 120° C. The rest of the ABS resin production procedure was the same as described in Example 1. The physical properties of the final ABS resin were measured and the results are shown in Table 1.

The physical properties of ABS resins produced in the above Examples and Comparative Examples were measured as follows.

- Mean diameter of rubber particles: 0.5 g of s tyrene rubber-modified resin was dissolved in 100 ml of methylethylkenone, and the mean diameter of rubber particles was measured by using Coulter counter (Beckman Coulter LS230).
- Izod Impact: Measured by ASTM D256.
- Tensile strength and elongation: Measured by ASTM D638.
- Gloss: Injection test piece 3 mm in thickness was prepared and then measured by ASTM 1003.
- Graft rate: Some (x) of ABS resin were added to acetone, followed by vibrating for 24 hours. The free resin thereby was dissolved. The solution was centrifuged at 14,000 rpm for one hour to obtain insoluble materials. The obtained insoluble materials were dried in a vacuum drier for 2 hours at 140° C., resulting in insoluble materials (Y). Graft rate was obtained by following formula.

Graft Rate (%)={Y−XR}/XR*100

(R:Rubber fraction of some (X) of ABS resin)

TABLE 1

|  | Examples | | | Comparative Examples | | |
| --- | --- | --- | --- | --- | --- | --- |
|  | 1 | 2 | 3 | 1 | 2 | 3 |
| Amount of monomers injected in graft reactor (weight %)* | 5 | 7.5 | 10 | 3 | 15 | 100 |
| Graft Rate (%) | 84 | 98 | 92 | 72 | 81 | 70 |
| Average size of rubber particles (μm) | 1.1 | 0.9 | 1.1 | 1.4 | 1.8 | 2.3 |
| Impact Strength (¼") (kg cm/cm) | 28 | 31 | 27 | 20 | 16 | 22 |
| (⅛") | 40 | 45 | 41 | 24 | 21 | 27 |
| Tensile Strength (kgcm$^2$) | 416 | 420 | 414 | 405 | 387 | 362 |
| Elongation (%) | 35 | 32 | 37 | 40 | 42 | 46 |
| Gloss (%) | 90 | 92 | 90 | 76 | 77 | 64 |

*Note)
Amount of monomers injected in graft reactor (%) = Amount of monomers injected in graft reactor/Amount of monomers injected in graft reactor + Amount of monomers injected in phase inversion reactor ×100

As shown in Table 1, 5–10 weight % of the total weight of monomer mixture was put in a graft reactor, and 90–95 weight % of the total weight of the monomer mixture was put in a phase inversion reactor, leading to the preparation of ABS resins of Examples 1–4. The ABS resins show excellent impact strength, tensile strength, and gloss, compared with those of Comparative Examples 1–3.

INDUSTRIAL APPLICABILITY

As explained hereinbefore, the preparation method for ABS resin of the present invention is very effective useful method to produce ABS resins having excellent impact strength and gloss by regulating grafting reaction.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A preparation method for acrylonitrile-butadiene-styrene resin by continuous bulk polymerization comprising the following steps:
   a) preparing a mixed solution of styrene monomers and acrylonitrile monomers by adding 5–10 weight % of the mixture of styrene monomers and acrylonitrile monomers to a reaction solvent;
   b) preparing a polymerization solution by dissolving butadiene rubber in the above mixed solution of styrene monomers and acrylonitrile monomers;
   c) polymerizing with a serial injection of the prepared polymerization solution and initiator in a grafting reactor;
   d) polymerizing the reaction solution of the above c) in a phase inversion reactor by adding 90–95 weight % of the total mixture of styrene monomers and acrylonitrile monomers thereto; and
   e) polymerizing further the reaction solution of the above step d) at 130–160° C.

2. The preparation method for acrylonitrile-butadiene-styrene resin as set forth in claim 1, wherein the step c) additionally includes the step of adding a molecular weight regulator in the grafting reactor by 0.01–1 weight %.

3. The preparation method for acrylonitrile-butadiene-styrene resin as set forth in claim 1, wherein the reaction solvent is one or more compounds selected from a group consisting of toluene, ethylbenzene and xylene.

4. The preparation method for acrylonitrile-butadiene-styrene resin as set forth in claim 1, wherein the butadiene rubber is either butadiene rubber or styrene-butadiene rubber.

5. The preparation method for acrylonitrile-butadiene-styrene resin as set forth in claim 1, wherein the styrene monomer is one or more compounds selected from a group consisting of styrene, α-methylstyrene, p-bromostyrene, p-methylstyrene, p-chlorostyrene and o-bromostyrene.

6. The preparation method for acrylonitrile-butadiene-styrene resin as set forth in claim 1, wherein the acrylonitrile monomer is one or more compounds selected from a group consisting of acrylonitrile, methacrylonitrile and ethacrylonitrile.

7. The preparation method for acrylonitrile-butadiene-styrene resin as set forth in claim 1, wherein the initiator is one or more organic peroxides selected from a group consisting of t-butylperoxy-2-hexanoate, 1,1-bis(t-butylperoxy)-3,3,5-trimethyl cyclohexane, 1,1-bis(t-butylperoxy) cyclohexane, 1,1-bis(t-butylperoxy)-2-methyl cyclohexane and 2,2-bis(4,4-di-t-butylperoxy cyclohexyl) propane.

8. The preparation method for acrylonitrile-butadiene-styrene resin as set forth in claim 2, wherein the molecular weight regulator is a thiol compound selected from the group consisting of t-dodecyl mercaptan and n-octyl mercaptan.

* * * * *